3,579,466
POLYGLYCIDYL POLYMERS AS DEMULSIFIERS
Patrick M. Quinlan, Webster Groves, Mo., assignor to Petrolite Corporation, Wilmington, Del.
No Drawing. Original application Mar. 8, 1965, Ser. No. 438,115. Divided and this application Jan. 17, 1969, Ser. No. 792,157
Int. Cl. B01d 17/04
U.S. Cl. 252—331
14 Claims

ABSTRACT OF THE DISCLOSURE

A process of demulsification which employs polyglycidyl polymers and copolymers thereof and derivatives thereof as demulsifiers.

---

This application is a division of application Ser. No. 438,115 filed Mar. 8, 1965, now abandoned.

This invention relates to polyglycidyl compounds and copolymers thereof; derivatives thereof and uses therefor.

These polymers are illustrated as follows:

(1) Dangling Oxygen Groups

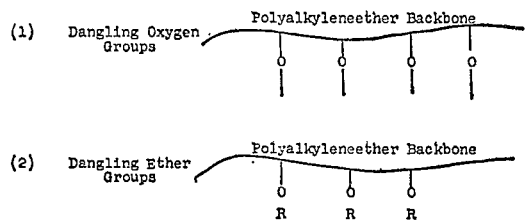

(2) Dangling Ether Groups

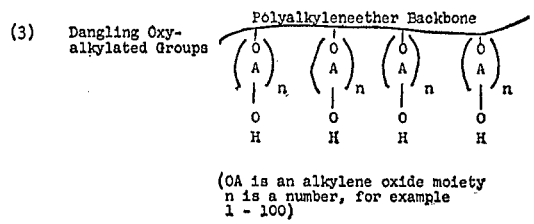

*(R is the moiety of an ether group, for example a hydrocarbon group, alkyl, cycloalkyl, aryl, etc.

(3) Dangling Oxyalkylated Groups

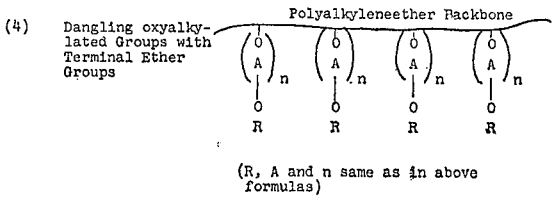

(OA is an alkylene oxide moiety n is a number, for example 1 - 100)

(4) Dangling oxyalkylated Groups with Terminal Ether Groups

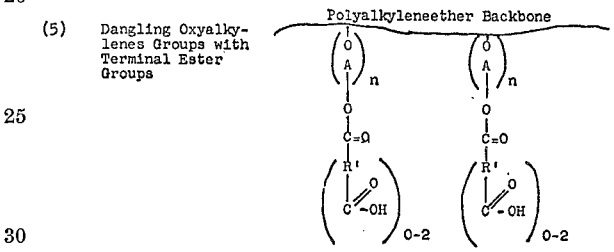

(R, A and n same as in above formulas)

(5) Dangling Oxyalkylenes Groups with Terminal Ester Groups

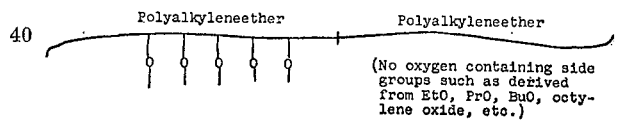

(R' is the moiety of the carboxylic acid)

The polyalkyleneether backbone can also be copolymerized with other alkylene oxides (OA), for example ethylene oxide, propylene oxide, butylene oxide, octylene oxide, styrene oxide, etc., as a random heterocopolymer, a block copolymer, etc. For example:

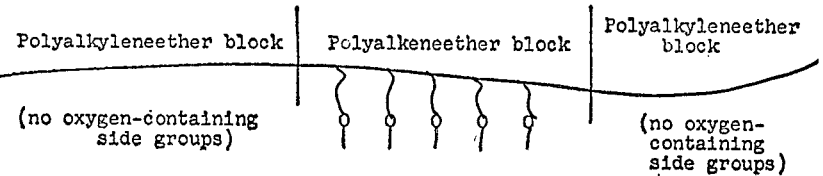

(No oxygen containing side groups such as derived from EtO, PrO, BuO, octylene oxide, etc.)

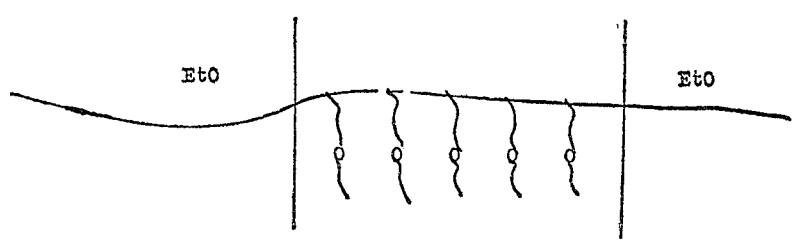

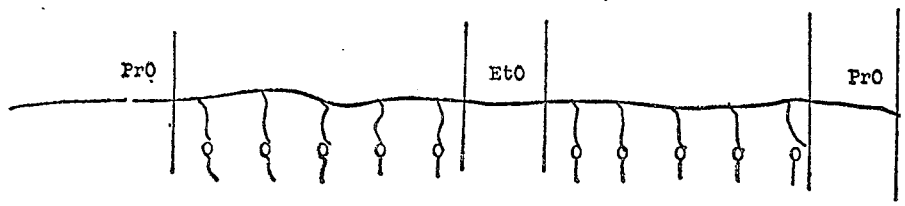

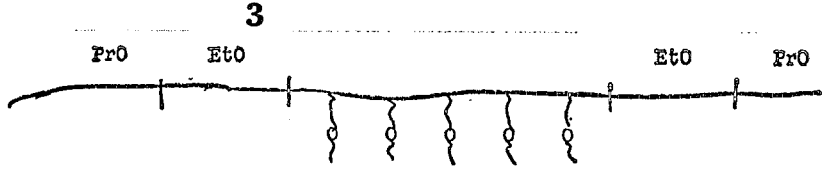

This invention also includes polyglycidyl amines, derivatives thereof, copolymers of polyglycidyl amines, derivatives thereof, etc.

For example

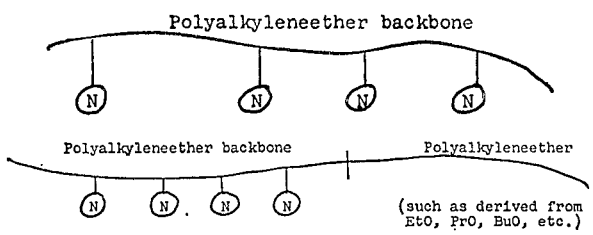

(such as derived from EtO, PrO, BuO, etc.)

These are generally derived from amino glycidyl compounds, etc., for example of the formula

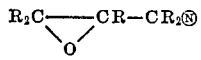

where the R's have the same meaning as stated above and Ⓝ is an amino-containing group, for example and preferably a tertiary amino group such as of the formula

where the R"s, which may be the same or different, are substituted groups for example hydrocarbon substituted groups preferably alkyl (methyl, ethyl, propyl, butyl, etc.), aryl (phenyl, alkylphenyl), heterocyclic, etc. In addition, the R"s may be joined to form heterocyclic groups

for example pyrridine, quinoline, morpholine, etc. Derivatives thereof can also be employed, for example, salts, quaternaries, etc.

The glycidyl ethers employed in preparing the polymers of this invention may be illustrated by the following formula

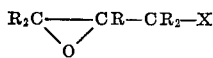

where the R's, which may be the same or different, are hydrogen or a substituted group such as a hydrocarbon group (alkyl, aryl, etc.) and X is a substituted group preferably —OH, —OR, —(OA)$_n$OH,

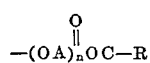

etc.; where the R's (which may be the same or different) are hydrocarbon groups such as an alkyl group (methyl, ethyl, propyl, butyl, etc.) aryl (phenyl, alkylphenyl, etc.). OA is the moiety derived from an alkylene oxide (ethylene oxide, propylene oxide, butylene oxide, octylene oxide, styrene oxide, etc.). n is a number which may be 1 or greater, such as about 1–100 for example 5–50 such as 5–10.

The molecular weight of the final polymer can vary widely depending on various factors, for example, the particular glycidyl ether employed, whether it is copolymerized, the intended use, the type dangling side chains, the particular derivative employed, etc. In general, the molecular weight can vary from about 500 to 50,000 or greater, such as from about 500 to 10,000, for example from about 500 to 7,500 but preferably from 2,000 to 5,000.

In addition the polyalkyleneether backbone (homo- or copolymers) can be reacted so as to have, for example, terminal ether, ester, etc. groups, for example:

RO—polyalkyleneether backbone—OH (with dangling group on all or part of backbone)
RO—polyalkyleneether backbone—OR' (dangling group all or part of backbone)

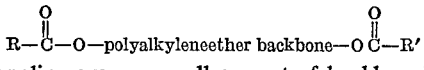

(with dangling groups on all or part of backbone)

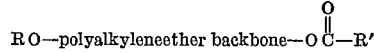

(with dangling groups on all or part of backbone)

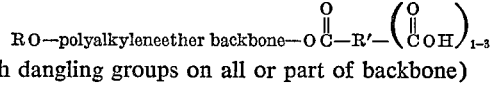

(with dangling groups on all or part of backbone)

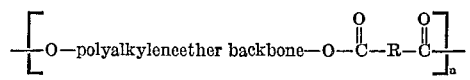

(with dangling groups on all or part of backbone)

It is well known that when a polybasic acid, and more specifically, a polycarboxy acid, X(COOH)$_2$, is reacted with a glycol, Y(OH)$_2$, where X is the moiety of the carboxylic acid and Y is the polyalkyleneether moiety having dangling groups, a mixture of polyesters of varying molecular weights result. This reaction is generally written:

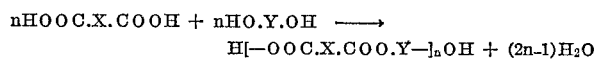

In actual practice, the polymeric ester product consists not of a single material, compound or ester, but of a mixture of cogeneric polyesters containing small amounts or unreacted monomers. The number-average molecular weight of the product depends upon the conditions and extent of reaction, increasing with the degree of esterification and loss of water of reaction. It has been shown that the actual content of the various cogeners in the polyester product may be estimated from the number-average molecular weight (see e.g., P. J. Flory, Chemical Review, 39, 137 (1946)).

In the preparation of polyesters, including those employed in the present invention, it is not necessary to employ equal molal proportions of polybasic acid and glycol. However, when unequal proportions of the reactants are employed, the degree of polymerization or average molecular weight of the polyester product will generally be less, for given reaction conditions, than where equal molal proportions are employed. This effect results from the formation of end groups derived from the reactant in excess, and is greater the further the proportion of reactants is from equality. In this connection it should be pointed out that, regardless of the proportions of reactants used, the polymeric product will contain cogeners of varying end group composition. As a simple example, let us consider a dibasic acid reactant, represented by Y(OH)$_2$. Then the various polyesters in the product may be represented by the following formulate, which show the three different types of end groups appearing in the cogeners:

HO[—Y'X'—]$_p$COOH

HO[—Y'X'—]$_p$Y.OH

HOOC.X[—Y'X'—]$_p$COOH

Here p is a whole number which may be as low as 1 or 2, generally less than 40, and between about 4 and 20 in the preferred products of this invention. X' and Y' in these formulae are residues of X(COOH)$_2$ and Y(OH)$_2$ joined by ester linkages. Where the polybasic acid contains three or more carboxyl groups, the formulae representing the various polyester products are, of course, more complex, but one still obtains three types of products, from the standpoint of end-group composition, similar to those shown for the simplified case. For purposes of this invention, polyesters also include certain monoesters which may also be formed, such as where $p=1$ such as $$\text{HOYO}\overset{O}{\underset{\|}{C}}-X-\overset{O}{\underset{\|}{C}}\text{OH}, \quad \text{HOYO}\overset{O}{\underset{\|}{C}}-X-\overset{O}{\underset{\|}{C}}-O-\text{YOH}$$

$$\text{HO}\overset{O}{\underset{\|}{C}}-X-\overset{O}{\underset{\|}{C}}\text{OY}-O\overset{O}{\underset{\|}{C}}-X-\overset{O}{\underset{\|}{C}}\text{OH}$$

and the like.

Suitable polycarboxy acids for use in preparing the present demulsifiers, include the commonly available organic dicarboxy and polycarboxy acids which are resistant to decarboxylation and pyrolysis under the usual esterification conditions. Of particular value and interest for the preparation of the present products, are the dicarboxylic acids, such as the aliphatic dicarboxylic acids: oxalic, malonic, succinic, glutonic, adipic, pimelic, azelaic, sebacic, maleic, fumaric, diglycollic, ethylene bisdiglycollic, citraconic, itaconic, dimeric fatty acids and the like. These and similar dibasic acids are easily reacted with the glycols specified below to yield linear polyesters. Carbonic acid is another suitable acid reactant, but is best employed as its diester, such as diethyl carbonate, with which polyesters are formed by ester interchange and evolution of the low boiling alcohol. Likewise, any of the polybasic acids can be used in the form of esters of low boiling monohydric alcohols. Also, the acid anhydrides, where they exist, may be used in place of the polybasic organic acid.

Other readily usable dibasic acids include phthalic acid, terephthalic acid, isophthalic, and adducts of maleic acid with various unsaturated hydrocarbons, such as diisobutylene, butadiene, retene, a-pinene and similar compounds.

Organic acids having a functionality greater than two may also be employed to obtain polyesters suitable for use in the present process. Where such acids are used, it is necessary to control, rather carefully, the reaction conditions and/or proportions of acid and glycol to avoid the formation of insoluble gel-like or rubbery polyester products. Examples of suitable acids of higher functionality, include aconitic acid, hemimellitic acid, trimellitic acid, acids obtained from brown coal, maleic acid adducts of linoleic acid, and the lke.

Glycidyl compounds are polymerized by heating in the presence of a suitable catalyst such as an alkaline catalyst, a Lewis acid catalyst, etc., until the desired molecular weight is obtained. For convenience, the conditions of the reactions including the monomer employed, reaction conditions and molecular weight of the products are summarized in the following examples and table.

EXAMPLE 4, TABLE I

Into a 250 ml. resin pot fitted with a stirrer, thermometer, and reflux condenser were introduced 116 g. (1 mole) of isopropyl glycidyl ether and 0.28 g. (0.05 mole) of powdered potassium hydroxide. The reaction mixture was stirred and heated to reflux (132° C.). As refluxing continued, the pot temperature slowly rose to 150° C. When this temperature was reached, external heating was discontinued. An exothermic reaction occurred, and the pot temperature quickly rose to 200° C. After the initial heat of reaction had subsided, the reaction mixture was further stirred and heated at 130° C. overnight.

The reaction mixtures was cooled, and sufficient benzene was added in order to form a solution of the polymer. The polymer solution was washed several times with dilute hydrochloric acid, and then filtered. The benzene was stripped off by heating in vacuo. The final product was a dark viscous liquid with an average molecular weight of 2100.

EXAMPLE 17, TABLE I

Into a 250 ml. resin pot fitted with a stirrer, thermometer, and reflux condenser were introduced 102 g. (1 mole) of ethyl glycidyl ether and 0.28 g. (0.05) mole of powdered potassium hydroxide. The reaction mixture was stirred and heated to reflux (123° C.). As refluxing continued, the pot temperature slowly rose to 150° C. When this temperature was reached, external heating was discontinued. An exothermic reaction occurred, and the pot temperature quickly rose to 200° C. After initial heat of reaction had subsided, the reaction mixture was further stirred and heated at 130° C. overnight.

The reaction mixture was cooled, and sufficient benzene was added in order to form a solution of the polymer. The polymer solution was washed several times with dilute hydrochloric acid, and then filtered. The benzene was stripped off by heating in vacuo.

The final product was a dark viscous liquid with an average molecular weight of 2360.

EXAMPLE 21, TABLE I

Into a 100 ml. resin pot fitted with a stirrer, thermometer, and reflux condenser were introduced 20.6 g. (0.1 mole) of para-tertiary-butyl phenyl glycidyl ether, and 50 ml. of benzene. To this stirred solution was slowly added a solution of 0.2 ml. of BF$_3$-etherate in 10 ml. of diethyl ether. In the course of the addition, the temperature of the reaction mixture rose quickly, and careful addition was necessary to prevent excessive refluxing. After the addition was completed, the solution was stirred for several minutes and cooled. The solution was neutralized with several drops of monoethanolamine, and all volatiles were stripped off by heating the solution in vacuo. The product was a hard resinous solid with a molecular weight of 1000.

Since the examples described herein are similarly prepared, they will be presented in tabular form to save repetitive details.

TABLE I

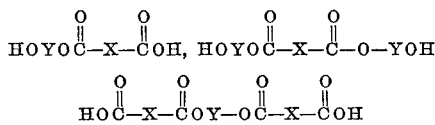

| | I | II | III | IV |
|---|---|---|---|---|
| | X of CH$_2$—CH—CH$_2$—X \\O/ | Catalyst | Molecular weight from OH values assuming OH's per molecule | Remarks |
| 1 | CH$_3$—C(CH$_3$)(CH$_3$)—⟨⟩—O— | KOH | 1,090 | Reacted at 180° C. for six hours. |
| 2 | Nonyl—⟨⟩—O— | KOH | 1,000 | Do. |
| 3 | Dodecyl—⟨⟩—O— | BF$_3$-etherate | | BF$_3$-etherate added slowly to benzene solution of glycidyl ether. |

TABLE I—Continued

| | I<br>X of<br>$CH_2$—CH—$CH_2$—X<br>\\O/ | II<br>Catalyst | III<br>Molecular weight from OH values assuming OH's per molecule | IV<br>Remarks |
|---|---|---|---|---|
| 4 | Isopropyl—O— | KOH | 2,100 | See example. |
| 5 | Allyl—O— | KOH | 1,000 | |
| 6 | Isopropyl—O— | BF$_3$-etherate | 1,050 | Glycidyl ether added slowly to BF$_3$-etherate in diethyl-ether. |
| 7 | tert-Butyl—O— | BF$_3$-etherate | 850 | |
| 8 | Isopropyl—O— | HO(—CH(CH$_3$)—CH$_2$O—)$_2$Na | 574 | Refluxed in xylene 120° C. 17 hours. |
| 9 | Same as above | HO(—CH(CH)—CH$_2$O—)$_2$Na | 1,250 | Refluxed in xylene 17 hours. |
| 10 | Isopropyl—O— | CH$_3$ONa | 1,640 | 90° C./22 hours. |
| 11 | Same as above | KOH | 1,170 | 100° C./15 hours. |
| 12 | Allyl—O— | HO(—C(CH$_3$)—CH$_2$—O—)$_2$Na | 1,410 | Reflux xylene 20 hours. |
| 13 | Phenyl—O— | HO(—C(CH$_3$)—CH$_2$O—)$_2$Na | 1,000 | 120° C. for 20 hours. |
| 14 | CH$_3$O(CH$_2$)$_3$—O— | CH$_3$ONa | 1,140 | 130° C./20 hours. |
| 15 | C$_6$H$_{13}$O(CH$_2$)$_2$—O— | KOH | 3,780 | 120° C./20 hours. |
| 16 | tert-Butyl phenoxyethyl—O— | CH$_3$ONa | 1,640 | 160° C./20 hours. |
| 17 | Ethyl—O— | KOH | 2,360 | See example. |
| 18 | Morpholino— | KOH | 1,330 | Do |
| 19 | Diethyl amino— | KOH | 2,100 | Do. |
| 20 | CH$_3$O(C$_3$H$_6$O)$_2$C$_3$H$_6$O— | KOH | 1,946 | Heated until exotherm occurred. Stirred and tested additional 20 hours at 130° C. |
| 21 | tert-Butyl phenyl—O— | BF$_3$—etherate | 1,000 | See example. |
| 22 | Isopropyl (Example 4) oxyalkylated with 20 moles EtO. | | | |
| 23 | Diethylamine (Example 19) oxyalkylated with 15 moles PrO. | | | |

TABLE II, EXAMPLE 4

Into a 50 ml. resin pot fitted with a stirrer, thermometer, and vacuum adapter were introduced 21 g. (0.01 mole) of poly (isopropyl glycidyl ether) having a molecular weight of 2100 (g./mole) and 1.3 g. (0.01 mole) of diglycolic acid. The reaction mixture was stirred and heated at 250° C. for 3 hours in vacuo (water aspirator).

The final product was a dark viscous liquid.

Since the other examples were similarly prepared and to save repetitive details, they are presented in tabular form in Table II.

TABLE II

| | I<br>Polymerized glycidyl ether R of<br>$CH_2$—CH—$CH_2$OR<br>\\O/ | II<br>Acid | III<br>Molar ratios I/II | IV<br>Catalyst, if any, and conditions |
|---|---|---|---|---|
| Example: | | | | |
| 1 | Ethyl | Diglycolic | 1 | 250°C./3 hours. |
| 2 | do | do | 1.5 | Do. |
| 3 | do | do | 0.7 | Do. |
| 4 | Isopropyl | do | 1 | See example. |
| 5 | do | do | 0.7 | Do. |
| 6 | do | do | 1.5 | Do. |
| 7 | tert-Butyl phenoxyethyl. | do | 1.0 | Do. |
| 8 | do | do | 1.5 | Do. |
| 9 | do | do | 0.7 | Do. |
| 10 | Allyl | do | 1.5 | p-Toluene sulfonic acid. Heated in solvent at 160°. for 6 hours. |
| 11 | do | do | 1.0 | Do. |
| 12 | Isopropyl | Phthalic | 1.0 | Do. |
| 13 | do | Adipic | 1.0 | Do. |

As is quite evident, new glycidyl ethers will be constantly developed which could be useful in my invention. It is, therefore, not only impossible to attempt a comprehensive catalogue of such compounds, but to attempt to describe the invention in its boader aspects in terms of specific glycidyl ethers used would be too voluminous and unnecessary since one skilled in the art could by following the description of the invention herein select a useful glycidyl ether and polymerize it. To precisely define each specific useful glycidyl ether in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific glycidyl ethers suitable for this invention by applying them in the invention set forth herein. In analogy to the case of a machine, wherein the use of certain materials of construction or dimensions of parts would lead to no practical useful result, various materials will be rejected as inapplicable where others would be operative. I can obviously assume that no one will wish to polymerize a useless glycidyl ether to a useless polymerized glycidyl ether or a copolymerized glycidyl ether nor will be misled because it is possible to misapply the teachings of the present disclosure to do so. Thus, any useful glycidyl ether, polymerized glycidyl ether or copolymerized glycidyl ether can be employed.

Breaking and preventing water-in-oil emulsions

This phase of the invention relates to the use of the products of the present invention in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constituted the continuous phase of the emulsion.

They also provide an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Miscellaneous solvents, such as pine oil, carbon tetrachloride, sulfur dioxide extract obtained in the refining of petroleum, etc., are often employed as diluents. Similarly, the material or materials employed as the demulsifying agent of this process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibits relatively limited oil-solubility. However, since such reagents are frequently used in a ratio of 1 to 10,000, or 1 to 20,000, or 1 to 30,000, or even 1 to 40,000 or 1 to 50,000, or more, as in desalting practice, such an apparent insolubility in oil and water is not significant, because said reagents undoubtedly have solubility within such concentrations.

In practicing the process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to be second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like. However, with extremely difficult emulsions higher concentrations of demulsifier can be employed.

In many instances the products herein specified as demulsifiers can be conveniently used without dilution. However, as previously noted, they may be diluted as desired with any suitable solvent. Selection of the solvent will vary, depending upon the solubility characteristics of the products, and, of course will be dictated in part by economic consideration, i.e., cost. The products herein described are useful not only in diluted form but also admixed with other chemical demulsifiers.

In recent years pipe line standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to nonresolvable solids. In addition the water phase should be free of oil so as not to create a disposal problem. Thus it is presently desirable to use a demulsifier that produces absolutely bright, haze-free oil in the top layer, yields little or no interphasal sludge, and has little if any oil in the water phase.

The following examples presented by way of illustration and not of limitation show results obtained by employing the instant polymer in the resolution of crude petroleum emulsions obtained from various sources.

Demulsifier No. 1.—The polymer employed was the diglycolic ester (molal ratio, acid to glycol 1:1) of the homo-polymer of isopropyl glycidyl ether (Example 4, Table II).

Demulsifier No. 2.—The polymer employed was the homo-polymer of ethyl glycidyl ether having a molecular weight of 2360 (Example 17, Table I).

Demulsifier No. 3.—The polymer employed was the homo-polymer of

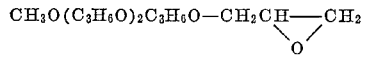

having a molecular weight of 1946 (Example 20, Table I).

Emulsified oil A.—This was from the Marge-Dortland Lease, Homestake Production Co., Russell County, Kans. The amount of water was equivalent to 34%.

Emulsified oil B.—This was from Frisby Lease Marathon Oil Co., Wyoming. The amount of water was equivalent to 16%.

Emulsified oil C.—This was from the Scott Lease, L. H. Foster Oil Co., Stephens County, Okla. The amount of water was equivalent to 72%.

Emulsified oil D.—This was from the Myles Salt Co. Lease, Shell Oil Co., Louisiana. The amount of water in it was equivalent to 32%.

Emulsified oil E.—This was from the North Coles Levee Lease, Richfield Oil Co., California. The amount of water was equivalent to 33%.

Emulsified oil F.—This was from M. F. Sholes Lease, Conoco Oil Co., Texas. The amount of water was equivalent to 25%.

Emulsified oil H.—This was from the Tensleys No. 1 Lease, Pan American Oil Co., Wyoming. The amount of water was equivalent to 31%.

The conditions of the tests are presented in Table III. In certain fields the water separated is practically quantitative, for example, in Examples 7 and 8, the percent of water separated was 31%, in Example 10 the percent water separated was 62%, in Example 11, 24%, etc., employing a test time of only 1 hour. The tests were carried out according to the procedures described in "Treating Oil Field Emulsions," 2nd ed. (revised 1962) issued by the Petroleum Extension Service, Texas Education Agency and American Petroleum Institute.

TABLE III

| Example: | Emulsified oil number | Demulsifier | Ratio of demulsifier to emulsified oil | Temperature, °F. | Hours |
|---|---|---|---|---|---|
| 1 | A | 1 | 6:10,000 | 80 | 1 |
| 2 | A | 2 | 6:10,000 | 80 | 1 |
| 3 | B | 3 | 15:10,000 | 160 | 1 |
| 4 | B | 2 | 15:10,000 | 160 | 1 |
| 5 | C | 1 | 10:10,000 | 90 | 1 |
| 6 | C | 2 | 15:10,000 | 90 | 1 |
| 7 | D | 1 | 2:10,000 | 90 | 1 |
| 8 | D | 2 | 2:10,000 | 90 | 1 |
| 9 | E | 1 | 1:10,000 | 80 | 1 |
| 10 | F | 3 | 3:10,000 | 80 | 1 |
| 11 | G | 3 | 1.5:10,000 | 80 | ¾ |
| 12 | H | 1 | 6:10,000 | 160 | 1 |

NOTE.—Time in the above tests was about 1 hour.

Having thus described my invention, what I claim as new and desire to obtain by Letters Patent is:

1. A process of demulsifying a water-in-oil emulsion comprising treating said emulsion with a glycidyl polymer of a glycidyl compound selected from the group consisting of (1) a glycidyl compound having the formula

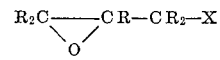

wherein

R is a member selected from the group consisting of hydrogen and a hydrocarbon group, and X is a member of the group consisting of —OR', —(OA)$_n$OH and

wherein

R' is a member selected from the group consisting of hydrogen and a hydrocarbon group, $R^2$ is a member selected from the group consisting of a hydrocarbon group,

—CH$_2$—O—CH$_2$—COOH

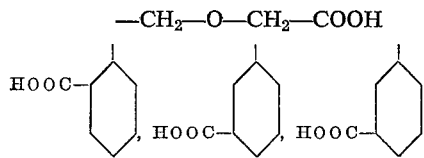

and —(CH$_2$)$_4$COOH,

A is an alkylene group, and $n$ is a member from 1–100, inclusive, and (2) a glycidyl compound having the formula

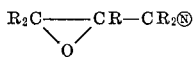

wherein

R is a member selected from the group consisting of hydrogen and a hydrocarbon group and Ⓝ is a member selected from the group consisting of

-morpholino, -pyrridino, -quinolino, and salts and quaternaries thereof, wherein $R^2$ is a hydrocarbon group, said polymer having a molecular weight of about 500 to 50,000.

2. The process of claim 1 wherein the glycidyl polymer is a polymer of a glycidyl compound having the formula

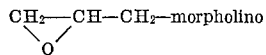

said polymer having a molecular weight of about 1330.

3. The process of claim 1 wherein the glycidyl polymer is a polymer of a glycidyl compound having the formula

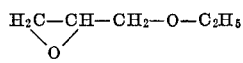

said polymer having a molecular weight of 2360.

4. The process of claim 1 wherein the glycidyl polymer is a polymer of a glycidyl compound having the formula

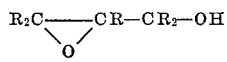

wherein R is a member selected from the group consisting of hydrogen and a hydrocarbon group, said polymer having a molecular weight of about 500 to 50,000.

5. The process of claim 1 wherein the glycidyl polymer is a polymer of a glycidyl compound having the formula

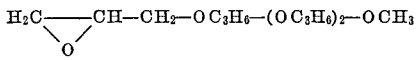

said polymer having a molecular weight of 1946.

6. The process of claim 1 wherein the glycidyl polymer is a polymer of a glycidyl compound having the formula

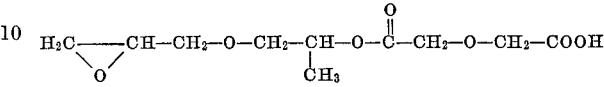

said polymer having a molecular weight of about 500 to 50,000.

7. The process of claim 1 wherein the glycidyl polymer is an oxyalkylated glycidyl polymer having the formula

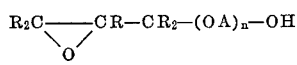

wherein

R is a member selected from the group consisting of hydrogen and a hydrocarbon group, A is an alkylene group, and $n$ is a number of from 1–100, inclusive, said polymer having a molecular weight of about 500 to 50,000.

8. The proces of claim 1 where the glycidyl polymer is acylated.

9. The process of claim 2 where the glycidyl polymer is acylated.

10. The process of claim 3 where the glycidyl polymer is acylated.

11. The process of claim 4 where the glycidyl polymer is acylated.

12. The process of claim 5 where the glycidyl polymer is acylated.

13. The process of claim 6 where the glycidyl polymer is acylated.

14. The process of claim 7 where the glycidyl polymer is acylated.

References Cited

UNITED STATES PATENTS

| | | | |
|---|---|---|---|
| 2,562,878 | 8/1951 | Blair, Jr. | 252—340 |
| 3,110,682 | 11/1963 | De Groote | 252—331 |
| 3,135,705 | 6/1964 | Vandenberg | 260—615B |
| 3,135,706 | 6/1964 | Vandenberg | 260—615B |
| 3,214,390 | 10/1965 | Vandenberg | 260—615B |
| 3,275,598 | 9/1966 | Garty et al. | 260—615F |

JOHN D. WELSH, Primary Examiner

U.S. Cl. X.R.

252—340